Figure 1:
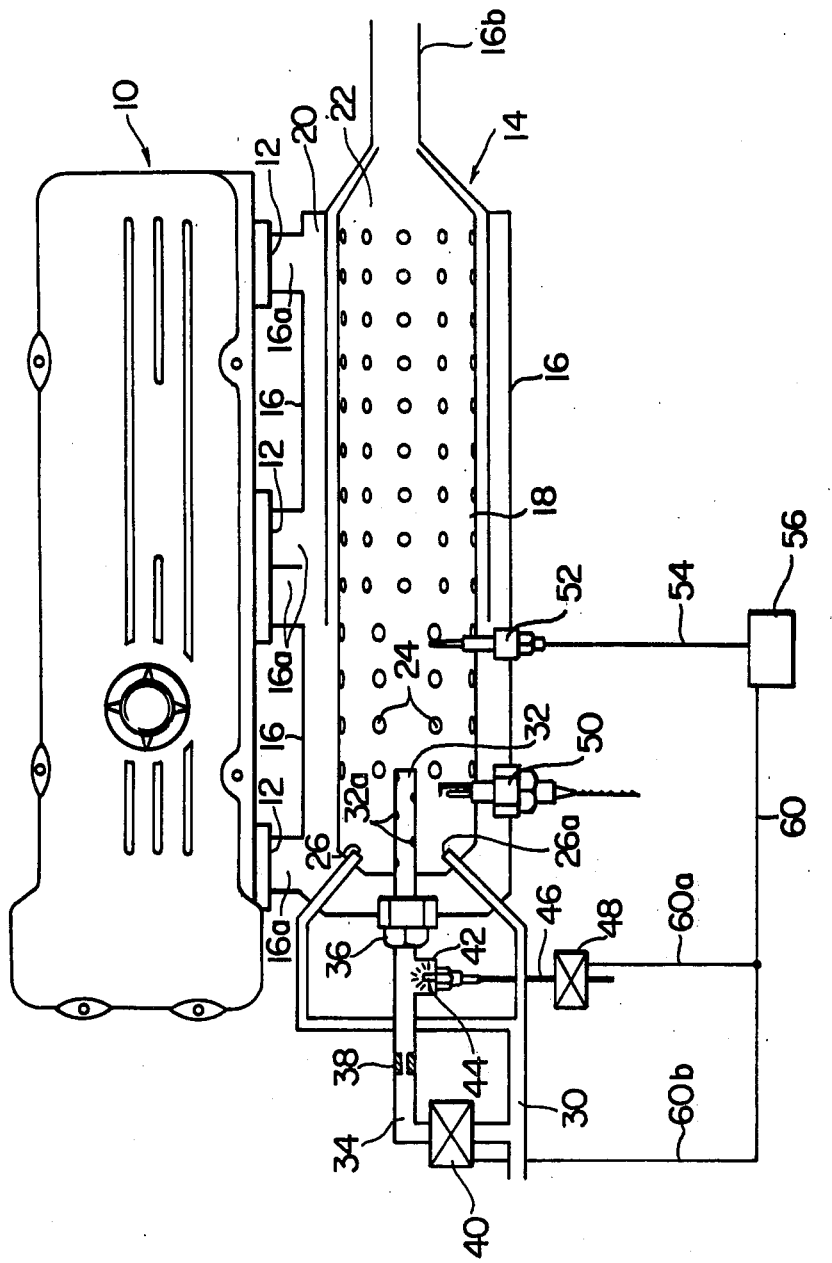

United States Patent [19]

Masaki et al.

[11] 4,033,123

[45] July 5, 1977

[54] INTERNAL COMBUSTION ENGINE EXHAUST GAS AFTER-BURNING SYSTEM

[75] Inventors: Kenji Masaki; Yoshio Ookubo, both of Yokohama, Japan

[73] Assignee: Nissan Motor Co., Ltd., Yokohama, Japan

[22] Filed: Jan. 6, 1976

[21] Appl. No.: 646,748

Related U.S. Application Data

[62] Division of Ser. No. 496,018, Aug. 8, 1974, abandoned.

[30] Foreign Application Priority Data

Aug. 17, 1973 Japan .............................. 48-92291

[52] U.S. Cl. ............................ 60/286; 23/277 C; 60/288; 60/303
[51] Int. Cl.² ......................................... F01N 3/14
[58] Field of Search ............ 60/286, 288, 303, 287, 60/274; 23/277 C

[56] References Cited

UNITED STATES PATENTS

| | | | |
|---|---|---|---|
| 2,864,960 | 12/1958 | Linde | 60/303 |
| 3,066,477 | 12/1962 | Houdry | 60/288 |
| 3,203,168 | 8/1965 | Thomas | 60/286 |
| 3,209,532 | 10/1965 | Morris | 60/288 |
| 3,248,872 | 5/1966 | Morrell | 60/274 |
| 3,716,996 | 2/1973 | Maruoka | 60/303 |

Primary Examiner—Douglas Hart

[57] ABSTRACT

A fuel vaporizer supplies fuel into a thermal reactor for promoting oxidative purification of unburned components of exhaust gases in presence of secondary air. The additional fuel is injected upstream into the gas stream flowing through a conduit to the fuel vaporizer.

4 Claims, 2 Drawing Figures

INTERNAL COMBUSTION ENGINE EXHAUST GAS AFTER-BURNING SYSTEM

This is a division of application Ser. No. 496,018, filed Aug. 8, 1974 now abandoned.

This invention relates in general to an internal combustion engine exhaust gas after-burning system. More particularly, it relates to a system incorporating a control device to control the amount of additional fuel supplied into a thermal reactor in accordance with the thermal reactor temperature.

It is well known to use a thermal reactor or an after-burner of the flame type as a furnace for unburned noxious components such as nitrogen oxides and hydrocarbons of exhaust gases discharged from an internal combustion engine. It is also well known to use a thermal reactor provided with an additional fuel supply means such as a fuel injection nozzle therein. In a thermal reactor of this type, when the thermal reactor temperature is relatively low or during the warm up period and light load operation of the engine, oxidative purification of the unburned components is accomplished by igniting additional fuel supplied through the additional fuel supply means and passing the exhaust gases containing the unburned components through the high temperature portion of the thermal reactor or bring the gases into direct contact with the burning fuel. In an internal combustion engine which runs on a lean air-fuel mixture, additional fuel is supplied through an additional fuel supply means into the thermal reactor because the amount of the unburned components introduced into the thermal reactor from the engine is too small to support combustion.

However, in the above-mentioned type of thermal reactor, difficulties have been encountered in that the additional fuel supply means is required to control fuel injection conditions such as fuel pressure, injection direction, and fuel particle size, and is subjected to high temperatures since it is generally disposed within the thermal reactor. The complicated construction and the short life of the additional fuel supply means have been therefore inevitable.

It is a primary object of the present invention to provide an improved internal combustion engine exhaust gas after-burning system which overcomes the difficulties of the prior art.

Another object of the present invention is to provide an improved exhaust gas after-burning system in which an additional fuel supply means is not subjected to the above mentioned conditions.

A further object of the present invention is to provide an improved exhaust gas after-burning system in which a control means controls the amount of an additional fuel supplied into a thermal reactor in dependence on the thermal reactor temperature.

Figure 2:
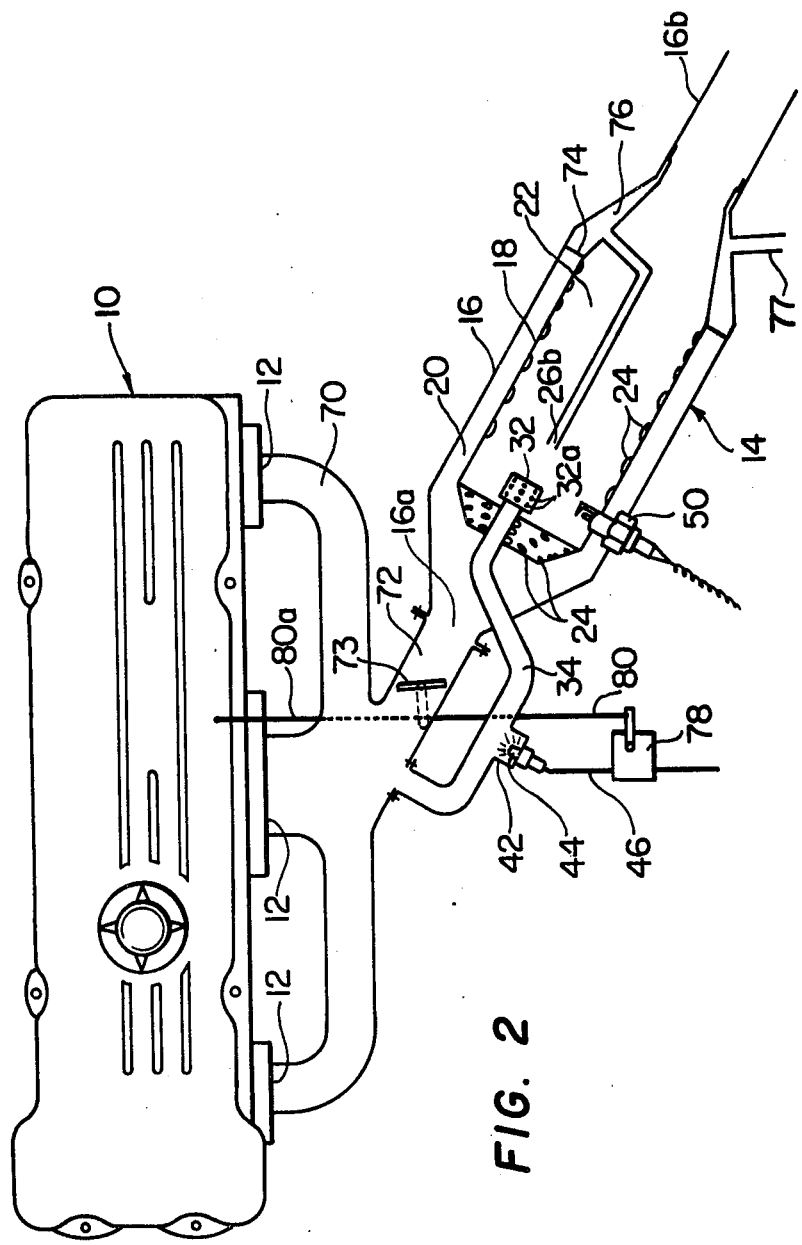

These and other objects and advantages of the present invention will become more apparent from the following description when taken in conjunction with the attached drawings, in which:

FIG. 1 is a schematic view of a preferred embodiment of an exhaust gas after-burning system according to the present invention; and FIG. 2 is a schematic view of another preferred embodiment of an exhaust gas after-burning system according to the present invention.

Referring now to FIG. 1, one preferred embodiment of an exhaust gas after-burning system of the invention is shown as incorporated in the exhaust pipe (no numeral) of a common internal combustion engine 10 having a plurality of exhaust ports 12. The exhaust ports 12 are connected to a thermal reactor 14 for oxidation of noxious components such as carbon monoxide and hydrocarbons in the exhaust gases from the internal combustion engine 10.

The thermal reactor 14, often called an after-burner, includes an outer casing 16 and an inner casing 18, both being of generally cylindrical, elongate shape. The outer casing 16 has a plurality of inlets 16a on the elongate portion thereof and an outlet 16b on one end portion thereof. An outer chamber 20 is defined between the outer casing 16 and the inner casing 18. An inner chamber or an after-burning chamber 22 is defined within the inner casing 18. The outer chamber 20 communicates with the after-burning chamber 22 through a plurality of openings 24 formed in the inner casing 18. The outer chamber 20 communicates with the exhaust ports 12 so as to be supplied with the exhaust gases which are in turn passed through the openings 24 into the after-burning chamber 22.

Although one would suffice, in FIG. 1 two secondary air injection nozzles 26 and 26a are shown and arranged to open to the after-burning chamber 22 through the upstream end portions of both the outer and inner casings 16 and 18. The nozzles 26 and 26a are branched off from a secondary air supply conduit 30 or a first conduit which communicates with a known secondary air source or a gas source (not shown).

A fuel vaporizer 32 is fixedly mounted on the upstream end portion of the outer casing 16 and projects through the upstream end portion of the inner casing 18 into the inner chamber 22. The fuel vaporizer 32 is in the form of an elongate, hollow cylinder which has a closed end projecting into the inner chamber 22. A plurality of openings 32a are formed in the hollow cylinder through which additional fuel vapor is discharged and distributed into the inner chamber 22. The other end of the fuel vaporizer 32 is connected through a suitable connector 36 to a conduit 34 or a second conduit for supply of secondary air therethrough. An orifice 38 for flow control is disposed within the conduit 34. The conduit 34 or the second conduit is connected through a second normally closed solenoid valve 40 to the secondary air supply conduit 30.

A recess 42 is formed in the conduit 34 between the connector 36 and the orifice 38. Disposed in the recess 42 is a fuel injection nozzle 44 to inject and spray additional fuel into the stream of air flowing through the conduit 34 to form fuel mist. The fuel injection nozzle 44 is connected to a fuel pipe 46 which is in turn connected through a first normally closed solenoid valve 48 through a known fuel pump to a fuel reservoir (not shown) for supplying additional fuel under pressure.

A spark plug 50 is fixedly mounted near the upstream end portion of the outer casing 16, and projects through the inner casing 18 in close proximity to the fuel vaporizer 32 and the secondary air injection nozzles 26 and 26a to ignite the air-fuel mixture. The spark plug 50 may be electrically connected to a known high voltage source (not shown).

A temperature sensor 52 is fixedly mounted in the elongate portion of the outer casing 16 and projects through the inner casing 18 into the inner chamber 22 to sense the temperature of the exhaust gases and provide a signal representing the temperature. The sensor 52 is electrically connected through a line 54 to a valve control unit 56 which in turn is electrically connected through lines 60, 60a and 60b to the first solenoid valve 48 and the second solenoid valve 40. The valve control unit 56 functions to energize the first and second solenoid valves 48 to 40 to open them and allow the additional fuel and the secondary air to flow in response to the sensed temperature of the exhaust gases in the inner chamber falling below a predetermined level. The predetermined level being the level below which the thermal reactor 14 will fail to function efficiently.

In operation, when the temperature of the exhaust gases in the inner chamber 22 falls below the predetermined level, the valve control unit 56 energizes the first and second normally closed solenoid valves 48 and 40 to open them in response to the signal transmitted from the temperature sensor 52. Accordingly, the secondary air flowing within the secondary air supply conduit 30 is allowed to flow into the conduit 34. This secondary air passes through the orifice 38 to the fuel vaporizer 32. Simultaneously, the additional fuel from the fuel pump (not shown) is injected or sprayed through the fuel injection nozzle 44 into the conduit 34 upstream of the fuel vaporizer 32. The formed fuel mist is carried into the fuel vaporizer 32 by the stream of secondary air and discharged and distributed through the openings 32a into the inner chamber 22 of the thermal reactor 14. The vaporized fuel is subsequently ignited by the already energized spark plug 50 and burned. The exhaust gases from the engine 10 are introduced through the exhaust ports 12 into the outer chamber 20 of the thermal reactor 14 and subsequently pass through the openings 24 formed in the inner casing 18 into the inner chamber 22. The exhaust gases containing the unburned noxious components are mixed with the secondary air injected from the secondary air injection nozzles 26 and 26a, and the mixture is exposed to the flame produced by the burning fuel from vaporizer 32 to oxidize the noxious components into harmless compounds.

After the temperature of the exhaust gases in the inner chamber 22 is sensed to exceeds the predetermined level, the valve control unit 56 de-energizes the first and second solenoid valves 48 and 40 to close them in response to the signal transmitted from the temperature sensor 52. Accordingly, the fuel flow through the fuel pipe 46 is blocked. At the same time, the secondary air flow through the conduit 34 is also blocked. The exhaust gases entering the inner chamber 22 are therefore after-burned by being mixed with the secondary air from the injection nozzles 26 and 26a, and ignited by the spark plug 50 without exposure to the flame produced by the fuel vaporizer 32 to oxidize the noxious components therein such as carbon monoxide and hydrocarbons. The thus purified exhaust gases are discharged through the outlet 16b of the thermal reactor 14 into the atmosphere.

Reference is now made to FIG. 2 showing another embodiment of an exhaust gas after-burning system of the invention, in which like numerals designate like elements and parts shown in FIG. 1. In this embodiment, the exhaust gas after-burning system is shown as incorporated in the exhaust pipe of a common internal combustion engine 10 or a gas source. The engine is provided with an exhaust manifold 70 connected to a plurality of exhaust ports 12 and an exhaust conduit 72 or a first conduit connected to the exhaust manifold 70.

A thermal reactor 14 is connected to the downstream end of the conduit 72. Within the conduit 72, an exhaust gas flow control valve 73 or a first flow control valve is rotatably disposed. The thermal reactor 14 includes an outer casing 16 and an inner casing 18, both being generally cylindrical and of elongate shape. The thermal reactor 14 has an inlet 16a at the upstream end portion and an outlet 16b at the downstream end portion. An outer chamber 20 is defined between the outer casing 16 and the inner casing 18. The downstream end portion of the inner casing 18 is open and sealed to the inner periphery of the outlet 16b. An inner chamber 22 or an after-burning chamber is defined within the inner casing 18. A partition wall 74 is disposed to form a heatable secondary air chamber 76 in the downstream portion of the outer chamber 20. The secondary air chamber 76 communicates with a secondary air source (not shown) through a secondary air inlet pipe 77.

From the secondary air chamber 76, a secondary air injection nozzle 26b projects into the inner chamber 22 and extends along the longitudinal axis toward the upstream end of the inner chamber 22. The secondary air chamber 76 serves to heat secondary air fed through the secondary air nozzle 26b once the temperature inside the after-burner chamber 22 reaches an elevated level. The outer chamber 20 other than the secondary air chamber 76 communicates through a plurality of openings 24 with the inner chamber 22.

An fuel vaporizer 32 is disposed adjacent to and facing the secondary air injection nozzle 26 in the after-burning chamber 22. The fuel vaporizer 32 has a plurality of openings 32a for distributing and vaporizing the fuel mist flowing therethrough. The fuel vaporizer 32 communicates through a conduit 34 or a second conduit with the exhaust conduit 72 connected to the exhaust manifold 70. The conduit 34 or the second conduit has a recess 42 fixedly disposed in which is an injection nozzle 44 to inject and spray additional fuel into conduit 34. The additional fuel injection nozzle 44 is connected to a fuel pipe 46 which in turn is connected via a fuel flow control valve 78 or a second flow control valve to a fuel reservoir through a known fuel pump (not shown). The fuel flow control valve 78 or the second flow control valve is mechanically connected through a suitable connecting means 80 such as a wire to the exhaust gas flow control valve 73 which is in turn mechanically connected through a suitable connecting means such as a wire 80a to an element sensing the engine load such as an acceleration pedal. The exhaust gas flow control valve 73 is arranged so as to open substantially proportionally to the engine load or depression of the acceleration pedal. On the contrary, the fuel flow control valve 78 is arranged so as to close substantially proportionally to the engine load or the depression of the acceleration pedal.

A spark plug 50 is fixedly disposed in the elongate portion of the outer casing 16 and projects through the inner casing 18 in close proximity to the fuel vaporizer 32. The spark plug 50 may be electrically connected to a known high voltage source (not shown).

In operation, when the engine load is relatively light and the exhaust gas temperature is therefore relatively low, the exhaust gas flow control valve 73 within the exhaust conduit 72 is partially closed and a relatively large amount of the exhaust gases from the engine 10 is therefore flowing through the conduit 34. At the same time, the fuel flow control valve 78 is wide open and a relatively large amount of additional fuel is sprayed by the fuel injection nozzle 44 into the conduit 34.

On the contrary, when the engine load is relatively heavy and the exhaust gas temperature is therefore relatively high, the exhaust gas flow control valve 73 is opened and a relatively small amount of the exhaust gases from the engine 10 is therefore introduced into the conduit 34. At the same time, the fuel flow control valve 78 is almost closed and a relatively small amount of the additional fuel is sprayed from the fuel pipe 46 through the additional fuel injection nozzle 44 into the conduit 34.

The thus injected additional fuel mist is carried into the fuel vaporizer 32 by the stream of exhaust gas flowing through the conduit 34. The fuel mist is thereafter distributed through the openings 32a into the space of the inner chamber 22. The vaporized fuel is ignited by the spark plug 50 and burned. The exhaust gases containing the unburned noxious components are mixed with the secondary air from the seconary air injection nozzle 26b and are after-burned by contact with the flame produced by burning the additional fuel from vaporizer 32. The thus prified exhaust gases are discharged through the outlet 16b of the thermal reactor 14 into the atmosphere.

Furthermore, a venturi may be formed in the conduit 34 into which venturi the fuel pipe 46 opens omitting the additional fuel injection nozzle 44 and the fuel flow control valve 78 of the embodiment in FIG. 2. In this modification, unpressurized additional fuel may be supplied into the conduit 34 approximately proportionally to the amount of the exhaust gases passing through the conduit 34 and the venturi therein.

It will be appreciated from the foregoing description that the additional fuel nozzle 44 of the exhaust gas after-burning system according to the present invention is not subjected to the severe conditions of the prior art and has a long life. In addition, the fuel vaporizer used in the reactor of the present invention can be applied to various types of thermal reactor as the conduit system is simple and thus easily mounted in any desired location in the reactor.

What is claimed is:

1. An exhaust gas after-burning system of an internal combustion engine, the engine having a plurality of exhaust ports and the system including:
   a thermal reactor communicating with the plurality of exhaust ports and having an after-burning chamber wherein a spark plug is provided to ignite a combustible mixture for after-burning unburned noxious compounds contained in the exhaust gas received from the exhaust ports;
   a secondary air injection nozzle disposed in the after-burning chamber for injecting secondary air thereinto and connected through a heatable chamber to a secondary air source;
   a first conduit connecting the after-burning chamber to the plurality of exhaust ports to receive exhaust gas for feeding into the after-burning chamber; and
   a second conduit connected at one end to the first conduit to receive a portion of the exhaust gas;
   a fuel injection nozzle disposed in the second conduit for spraying additional fuel to form additional fuel mist within the exhaust gas therein; and
   a fuel vaporizer connected to the other end of the second conduit and disposed in the after-burning chamber to distribute the additional fuel mist in the after-burning chamber for instant vaporizing.

2. An exhaust gas after-burning system according to claim 1, further comprising control means for controlling injection and spraying of additional fuel through said fuel injector nozzle in response to the engine load.

3. An exhaust gas after-burning system according to claim 2, in which the control means includes a first flow control valve disposed within the first conduit for controlling the amount of the exhaust gases passed through the second conduit in response to the engine load, the first control valve being mechanically connected to an element sensing the engine load so as to be operable substantially proportionally to the engine load.

4. An exhaust gas after-burning system according to claim 3, further including a second flow control valve fluidly connected to said fuel injection nozzle for controlling the amount of additional fuel flow therethrough, the second flow control valve being mechanically connected to the element sensing the engine load to be closable substantially proportionally to the engine load.

* * * * *